United States Patent
Berg et al.

(10) Patent No.: US 10,924,881 B2
(45) Date of Patent: Feb. 16, 2021

(54) DEVICE FOR DETERMINING CONSTRUCTION DEVICE AND WORKER POSITION

(71) Applicant: HUSQVARNA AB, Huskvarna (SE)

(72) Inventors: Johan Berg, Alingsås (SE); Anders Erestam, Gothenburg (SE)

(73) Assignee: HUSQVARNA AB, Huskvarna (SE)

( * ) Notice: Subject to any disclaimer, the term of this patent is extended or adjusted under 35 U.S.C. 154(b) by 236 days.

(21) Appl. No.: 15/446,345

(22) Filed: Mar. 1, 2017

(65) Prior Publication Data

US 2017/0255193 A1 Sep. 7, 2017

(30) Foreign Application Priority Data

Mar. 3, 2016 (SE) .................................. 1650281-7

(51) Int. Cl.
  *G05B 19/048* (2006.01)
  *H04W 4/021* (2018.01)
  *H04W 4/80* (2018.01)

(52) U.S. Cl.
  CPC .......... *H04W 4/021* (2013.01); *G05B 19/048* (2013.01); *H04W 4/80* (2018.02)

(58) Field of Classification Search
  CPC ........ G05D 1/0088; G05B 2219/39377; G05B 2219/40203; G05B 19/048; G06Q 50/08; B25J 19/06; B25J 9/1674; B66C 13/46; H04W 4/021; H04W 4/80
  See application file for complete search history.

(56) References Cited

U.S. PATENT DOCUMENTS

| 5,631,658 | A | * | 5/1997 | Gudat | A01B 79/005 342/457 |
| 5,987,379 | A | * | 11/1999 | Smith | G08B 21/0288 701/468 |
| 7,298,258 | B1 | * | 11/2007 | Hudgens | G07C 9/00111 340/3.1 |
| 7,343,222 | B2 | * | 3/2008 | Solomon | F41H 13/00 318/568.11 |
| 7,850,621 | B2 | * | 12/2010 | Briggs | A61B 5/150412 600/583 |
| 8,154,590 | B2 | * | 4/2012 | Kressel | F16P 3/142 348/77 |
| 9,047,781 | B2 | * | 6/2015 | Geter | G08G 1/166 |
| 9,164,512 | B2 | * | 10/2015 | Oobayashi | G05D 1/0214 |
| 9,334,627 | B2 | * | 5/2016 | Self | G01S 3/143 |
| 9,348,336 | B2 | * | 5/2016 | Sisbot | G05D 1/0278 |
| 9,513,606 | B1 | * | 12/2016 | Larsen | G05B 9/02 |
| 9,898,930 | B2 | * | 2/2018 | Frederick | F16P 3/14 |
| 9,981,385 | B2 | * | 5/2018 | Lewis | B25J 9/1676 |
| 9,981,394 | B2 | * | 5/2018 | Haman | F16P 3/148 |
| 10,019,903 | B2 | * | 7/2018 | Lee | G08G 1/162 |

(Continued)

FOREIGN PATENT DOCUMENTS

GB 2492332 A 1/2013

*Primary Examiner* — Darrin D Dunn
(74) *Attorney, Agent, or Firm* — Burr & Forman, LLP

(57) ABSTRACT

A construction site status monitoring device is provided including processing circuitry configured to receive construction device location data associated with a construction device, receive worker location data associated with a worker, and determine a safety condition based on the construction device location data and the worker location data.

15 Claims, 5 Drawing Sheets

(56) References Cited

U.S. PATENT DOCUMENTS

| | | | |
|---|---|---|---|
| 10,025,304 B1* | 7/2018 | Stubbs | B25J 9/1666 |
| 10,065,316 B2* | 9/2018 | Sussman | B25J 9/1676 |
| 10,071,481 B2* | 9/2018 | Nishino | A61B 5/02055 |
| 10,099,372 B2* | 10/2018 | Vu | G01S 17/87 |
| | | | 414/685 |
| 10,606,963 B2* | 3/2020 | Tiwari | G06F 30/13 |
| 2003/0004645 A1* | 1/2003 | Kochi | G06T 7/593 |
| | | | 702/1 |
| 2003/0052877 A1* | 3/2003 | Schwegler, Jr. | G06F 30/13 |
| | | | 345/420 |
| 2004/0148039 A1* | 7/2004 | Farchmin | G05B 19/122 |
| | | | 700/79 |
| 2006/0041381 A1* | 2/2006 | Simon | G01S 13/931 |
| | | | 701/301 |
| 2006/0049939 A1* | 3/2006 | Haberer | F16P 3/142 |
| | | | 340/541 |
| 2007/0035311 A1* | 2/2007 | Wuersch | B23B 49/006 |
| | | | 324/644 |
| 2007/0194922 A1* | 8/2007 | Nathan | A62B 99/00 |
| | | | 340/572.1 |
| 2007/0194944 A1* | 8/2007 | Galera | F16P 3/14 |
| | | | 340/686.6 |
| 2007/0255498 A1* | 11/2007 | McDaniel | G01S 13/931 |
| | | | 701/301 |
| 2007/0276600 A1* | 11/2007 | King | G08G 1/042 |
| | | | 701/301 |
| 2008/0018472 A1 | 1/2008 | Dasilva et al. | |
| 2008/0196911 A1* | 8/2008 | Krapf | B23B 49/006 |
| | | | 173/4 |
| 2009/0043462 A1* | 2/2009 | Stratton | E02F 9/2033 |
| | | | 701/50 |
| 2009/0083100 A1* | 3/2009 | Darby, Jr. | G06Q 10/0635 |
| | | | 705/7.28 |
| 2010/0057254 A1* | 3/2010 | Salamanca | B25J 11/00 |
| | | | 700/245 |
| 2010/0066559 A1* | 3/2010 | Judelson | G08B 19/005 |
| | | | 340/8.1 |
| 2010/0068024 A1* | 3/2010 | Agens | B66C 3/18 |
| | | | 414/729 |
| 2010/0114635 A1* | 5/2010 | Watanabe | G06Q 50/08 |
| | | | 705/7.12 |
| 2010/0217528 A1* | 8/2010 | Sato | G05D 1/0214 |
| | | | 701/301 |
| 2010/0222954 A1* | 9/2010 | Ichinose | G05D 1/024 |
| | | | 701/26 |
| 2010/0269327 A1* | 10/2010 | Gray | B23Q 39/027 |
| | | | 29/592 |
| 2010/0289662 A1* | 11/2010 | Dasilva | F16P 3/147 |
| | | | 340/686.6 |
| 2010/0299110 A1* | 11/2010 | Mather | B01J 19/002 |
| | | | 703/1 |
| 2010/0312388 A1* | 12/2010 | Jang | G05D 1/0088 |
| | | | 700/248 |
| 2011/0020084 A1* | 1/2011 | Brett | B23Q 15/013 |
| | | | 408/1 R |
| 2011/0050878 A1* | 3/2011 | Wells | H04N 7/181 |
| | | | 348/86 |
| 2011/0115816 A1* | 5/2011 | Brackney | H05B 47/10 |
| | | | 345/629 |
| 2011/0264266 A1* | 10/2011 | Kock | B25J 9/1676 |
| | | | 700/253 |
| 2011/0279261 A1* | 11/2011 | Gauger | F16P 3/16 |
| | | | 340/539.1 |
| 2011/0295496 A1* | 12/2011 | Petrie | B60T 7/22 |
| | | | 701/117 |
| 2011/0298579 A1* | 12/2011 | Hardegger | G01S 17/10 |
| | | | 340/3.1 |
| 2011/0301995 A1* | 12/2011 | Fukuda | G06Q 10/063116 |
| | | | 705/7.16 |
| 2012/0066019 A1* | 3/2012 | Hinshaw | G06Q 10/06313 |
| | | | 705/7.23 |
| 2012/0098653 A1* | 4/2012 | Slack | B60Q 9/008 |
| | | | 340/435 |
| 2012/0182155 A1* | 7/2012 | Sato | B25J 9/1674 |
| | | | 340/686.6 |
| 2012/0218080 A1* | 8/2012 | Gu | G06Q 10/06 |
| | | | 340/8.1 |
| 2012/0306664 A1* | 12/2012 | Geter | G08G 1/166 |
| | | | 340/903 |
| 2012/0308354 A1* | 12/2012 | Tafazoli Bilandi | E02F 9/264 |
| | | | 414/685 |
| 2013/0035791 A1* | 2/2013 | Chiu | B25J 9/1692 |
| | | | 700/253 |
| 2013/0255574 A1* | 10/2013 | Cunningham | B60P 1/5438 |
| | | | 118/712 |
| 2013/0335221 A1* | 12/2013 | Prieto | G06Q 10/10 |
| | | | 340/540 |
| 2014/0002271 A1* | 1/2014 | Frederick | F16P 3/145 |
| | | | 340/686.6 |
| 2014/0007442 A1* | 1/2014 | Pettersson | B25H 1/0092 |
| | | | 33/626 |
| 2014/0095119 A1* | 4/2014 | Lee | G06Q 10/0631 |
| | | | 703/1 |
| 2014/0135984 A1* | 5/2014 | Hirata | B25J 9/1676 |
| | | | 700/255 |
| 2014/0159888 A1* | 6/2014 | Gauger | F16P 3/14 |
| | | | 340/438 |
| 2014/0200863 A1* | 7/2014 | Kamat | G01C 15/00 |
| | | | 703/1 |
| 2014/0207512 A1* | 7/2014 | Khanzode | G06Q 10/06312 |
| | | | 705/7.22 |
| 2014/0222247 A1* | 8/2014 | Friend | G05D 1/0276 |
| | | | 701/2 |
| 2014/0309918 A1* | 10/2014 | Rivet | F16P 3/147 |
| | | | 701/301 |
| 2014/0375445 A1* | 12/2014 | Frederick | G08B 21/0275 |
| | | | 340/435 |
| 2015/0019280 A1* | 1/2015 | Mejegard | G06Q 10/06 |
| | | | 705/7.23 |
| 2015/0090086 A1* | 4/2015 | Winkler | B23D 47/123 |
| | | | 83/13 |
| 2015/0151748 A1* | 6/2015 | Benmimoun | B60W 10/184 |
| | | | 701/41 |
| 2015/0158178 A1* | 6/2015 | Burmeister | B25J 9/1676 |
| | | | 382/203 |
| 2015/0170498 A1* | 6/2015 | Beggs | B60Q 9/008 |
| | | | 340/686.6 |
| 2015/0235082 A1* | 8/2015 | Culp | G06T 11/60 |
| | | | 382/113 |
| 2015/0317897 A1* | 11/2015 | Frederick | G08B 21/22 |
| | | | 340/686.6 |
| 2015/0329130 A1* | 11/2015 | Carlson | B61L 3/125 |
| | | | 246/122 R |
| 2015/0369597 A1* | 12/2015 | Herger | G05B 13/0205 |
| | | | 700/302 |
| 2016/0040827 A1* | 2/2016 | Merx | G05B 9/02 |
| | | | 700/79 |
| 2016/0042309 A1* | 2/2016 | Clemenson | G09B 29/007 |
| | | | 705/7.15 |
| 2016/0078767 A1* | 3/2016 | Michaud | G08G 1/165 |
| | | | 340/435 |
| 2016/0090038 A1* | 3/2016 | Briggs | B60Q 1/305 |
| | | | 340/435 |
| 2016/0271800 A1* | 9/2016 | Stubbs | B25J 9/1666 |
| 2016/0299509 A1* | 10/2016 | Ueda | B25J 9/1676 |
| 2016/0319989 A1* | 11/2016 | Ramaswamy | B23D 59/002 |
| 2016/0325675 A1* | 11/2016 | Bharwani | B60Q 9/008 |
| 2017/0025016 A1* | 1/2017 | Frederick | F16P 3/14 |
| 2017/0100838 A1* | 4/2017 | Lewis | B25J 9/1676 |
| 2017/0103661 A1* | 4/2017 | Greene | G08G 5/0008 |
| 2017/0162049 A1* | 6/2017 | Lee | G08G 1/162 |
| 2017/0162050 A1* | 6/2017 | Chen | B60W 30/09 |
| 2017/0197313 A1* | 7/2017 | Nishino | A61B 5/02055 |
| 2017/0320492 A1* | 11/2017 | Ferrari | B60W 30/0953 |
| 2018/0029233 A1* | 2/2018 | Lager | B25J 9/1676 |
| 2018/0067593 A1* | 3/2018 | Tiwari | G08B 13/04 |
| 2018/0151078 A1* | 5/2018 | Frederick | F16P 3/14 |
| 2018/0169815 A1* | 6/2018 | Barr | B23D 59/001 |
| 2018/0222051 A1* | 8/2018 | Vu | G01S 17/026 |

(56) References Cited

U.S. PATENT DOCUMENTS

| | | | |
|---|---|---|---|
| 2018/0231974 A1* | 8/2018 | Eggert | B60W 50/0097 |
| 2018/0244292 A1* | 8/2018 | Bailey | B61L 23/00 |
| 2018/0252832 A1* | 9/2018 | Smoot | G01R 27/26 |
| 2019/0030717 A1* | 1/2019 | Rublee | G05D 1/0289 |
| 2019/0258750 A1* | 8/2019 | Pinho | G06F 40/166 |
| 2020/0225313 A1* | 7/2020 | Coles | G08B 29/188 |

* cited by examiner

DEVICE FOR DETERMINING CONSTRUCTION DEVICE AND WORKER POSITION

CROSS REFERENCE TO RELATED APPLICATIONS

This application claims priority to Swedish application number 1650281-7 filed Mar. 3, 2016, the entire contents of which are hereby incorporated by reference in its entirety.

TECHNICAL FIELD

Example embodiments generally relate to construction equipment and, more particularly, relate to determining a safety condition based on construction device and worker location.

BACKGROUND

Construction equipment includes such devices as saws, drills, generators, nail guns, demolition robots, and the like. These devices are often used to perform tasks that inherently produce debris, and they are also inherently required to be mobile. Accordingly, these devices are typically made to be relatively robust and capable of handling difficult work in hostile environments, while balancing the requirement for mobility. However, these devices typically also include some form of working assembly or element that is capable of cutting working material, breaking working materials, drilling holes, driving nails or rivets, or the like.

The working element of a construction device may be utilized on working materials, such as, floors, ceiling, and/or walls in a construction site. The working element of the construction device or projectiles, such as nails, or rivets, may penetrate the working material. In an instance in which the working area is not properly supervised, workers located on the opposite side of the floor, ceiling, or wall may be injured by the working element and/or debris associated with a construction operation.

BRIEF SUMMARY OF SOME EXAMPLES

In an example embodiment, a construction site status monitoring device is provided including processing circuitry configured to receive construction device location data associated with a construction device, receive worker location data associated with a worker, and determine a safety condition based on the construction device location data from the construction device and the worker location data.

In another example embodiment, a construction site status monitoring system is provided including a construction device, a personnel device, and a construction site status monitoring device. The construction site status monitoring device may include processing circuitry configured to receive construction device location data associated with the construction device, receive worker location data associated with a worker from the personnel device, and determine a safety condition based on the construction device location data and the worker location data.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
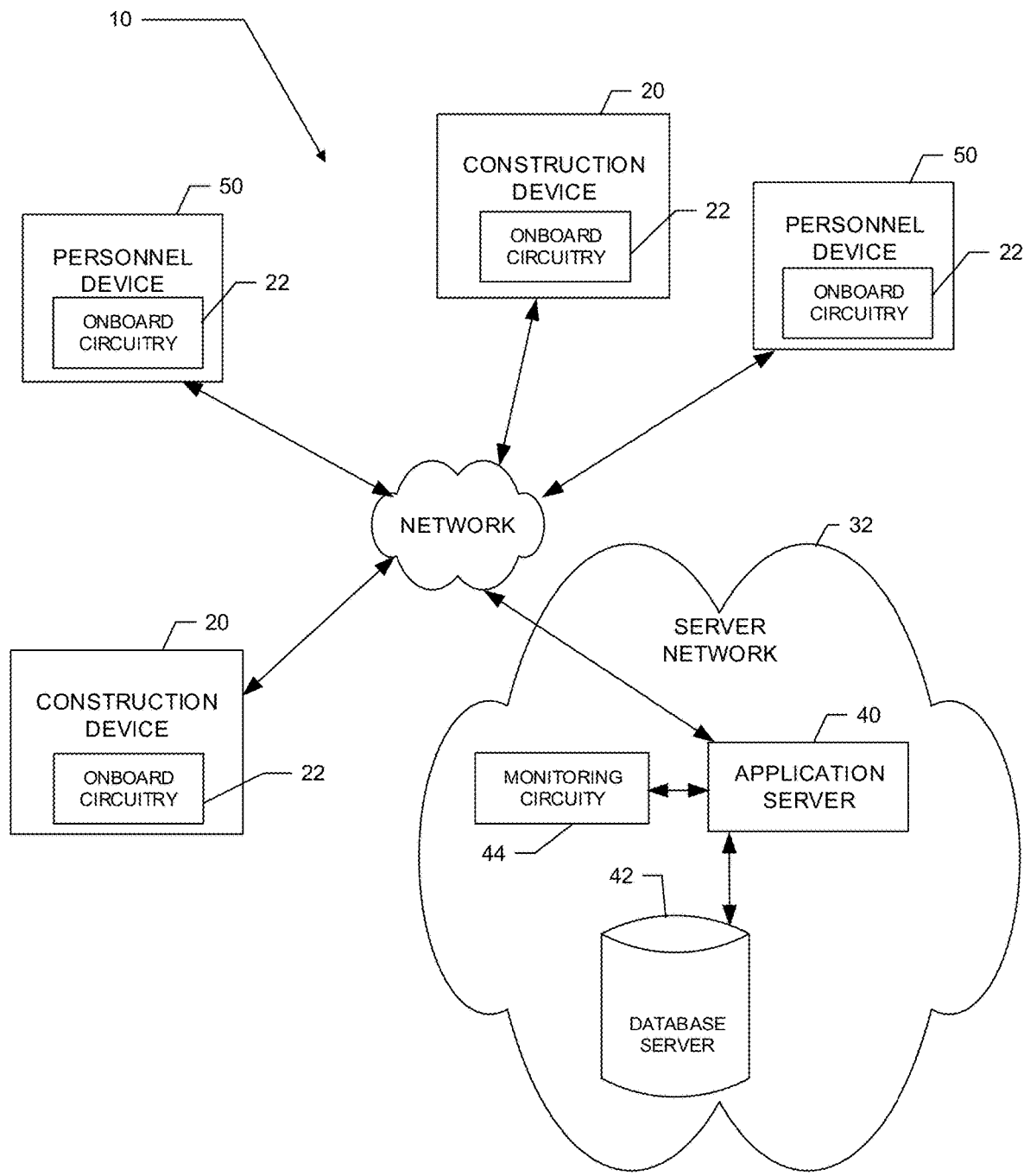
FIG. 1 illustrates a block diagram of a system according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein provide a construction site status monitoring device that may be employed on any of a number of different construction devices. The construction site status monitoring device may determine a safety condition based on construction device location data received associated with a construction device and worker location data associated with a worker. In some instances, the safety condition may be determined based on the distance between the construction device and the worker satisfying a predetermined safety threshold. In some example embodiments, the safety condition may be based on the operating condition and/or orientation of a working element of the construction device.

In an example embodiment, the construction site monitoring device may cause an alert to be actuated to alert a construction device operator, other workers, or a supervisor of the proximity of the construction device and worker. In some example embodiments, the construction site status device may cause the construction device to shutdown based on the safety condition to prevent causing injury to a worker.

In an example embodiment, the construction site status monitoring device may receive a construction site map. The construction site status monitoring device may utilize the position of walls, ceiling, floors, or the like, of structures within the construction site in determining the safety condition. The construction site status monitoring device may generate a safety map based on the location of the construction devices, workers, and the construction site map. The safety map and/or construction site map may be displayed on a user interface of a personnel device such as a smart phone, personal data assistant, laptop computer, or the like.

In some example embodiments, a material catcher construction device may be deployed based on the safety map. The material catcher may be positioned beneath a construction operation to catch falling debris and/or warn workers of the construction operation. The material catcher may additionally transport the debris to a waste collection area.

FIG. 1 illustrates an example system in which an embodiment of the present invention may be employed. In this regard, FIG. 1 illustrates a generic example of a system in which various devices that are examples of construction equipment may utilize a network for the performance of construction site coordination according to an example embodiment. As shown in FIG. 1, a system 10 according to an example embodiment may include one or more client devices (e.g. construction devices 20 and personnel devices 50). Notably, although FIG. 1 illustrates four devices 20, 50 it should be appreciated that many more devices 20, 50 may be included in some embodiments and thus, the four devices 20, 50 of FIG. 1 are simply used to illustrate a multiplicity of devices 20, 50 and the number of devices 20, 50 is in no way limiting to other example embodiments. In this regard, example embodiments are scalable to inclusion of any number of devices 20, 50 being tied into the system 10. Moreover, it should be appreciated that FIG. 1 illustrates one example embodiment in which shared resources may be allocated within a community of networked devices (e.g. devices 20, 50). However, it should be appreciated that the architecture of various example embodiments may vary. Thus, the example of FIG. 1 is merely provided for ease of explanation of one example embodiment and should not be considered to be limiting with respect to the architecture of the system 10. Accordingly, for example, some embodiments may have specific sets of devices 20, 50 that are associated with corresponding specific servers that belong to or are utilized by a particular organization, entity or group over a single network (e.g. network 30). However, in other embodiments, multiple different sets of devices 20, 50 may be enabled to access other servers associated with different organizations, entities or groups via the same or a different network.

The devices 20, 50 may, in some cases, each include sensory, computing and/or communication devices associated with different devices 20, 50 that belong to or are associated with a single organization, for example fleet management of devices 20, 50 at a construction site. In another example, a first device 20, 50 may be associated with a first facility or location of a first organization. Meanwhile, a second device may be associated with a second facility or location of the first organization. As such, for example, some of the devices 20, 50 may be associated with the first organization, while other ones of the devices 20, 50 are associated with a second organization. Thus, for example, the devices 20, 50 may be remotely located from each other, collocated, or combinations thereof. However, in some embodiments, each of the devices 20, 50 may be associated with individuals, locations or entities associated with different organizations or merely representing individual devices.

Each one of the construction devices 20 may include a housing inside which a power unit or motor (not shown) is housed. In some embodiments, the power unit may be an electric motor, an internal combustion engine, hydraulic system, pneumatic system, combustion chamber, or the like. The construction devices 20 may each further include a working element. The working element may be operated via the power unit to perform construction operations, such as drilling, cutting, demolishing, nailing, or the like. Various example types of construction devices 20 with which example embodiments may be associated should be understood to have corresponding different types of work elements (e.g. blades, cutting chains, drill bits, nailers, or the like). The construction devices 20 may include sensors for monitoring location, device operation, orientation, or the like, as discussed below in reference to FIG. 2.

Figure 2:
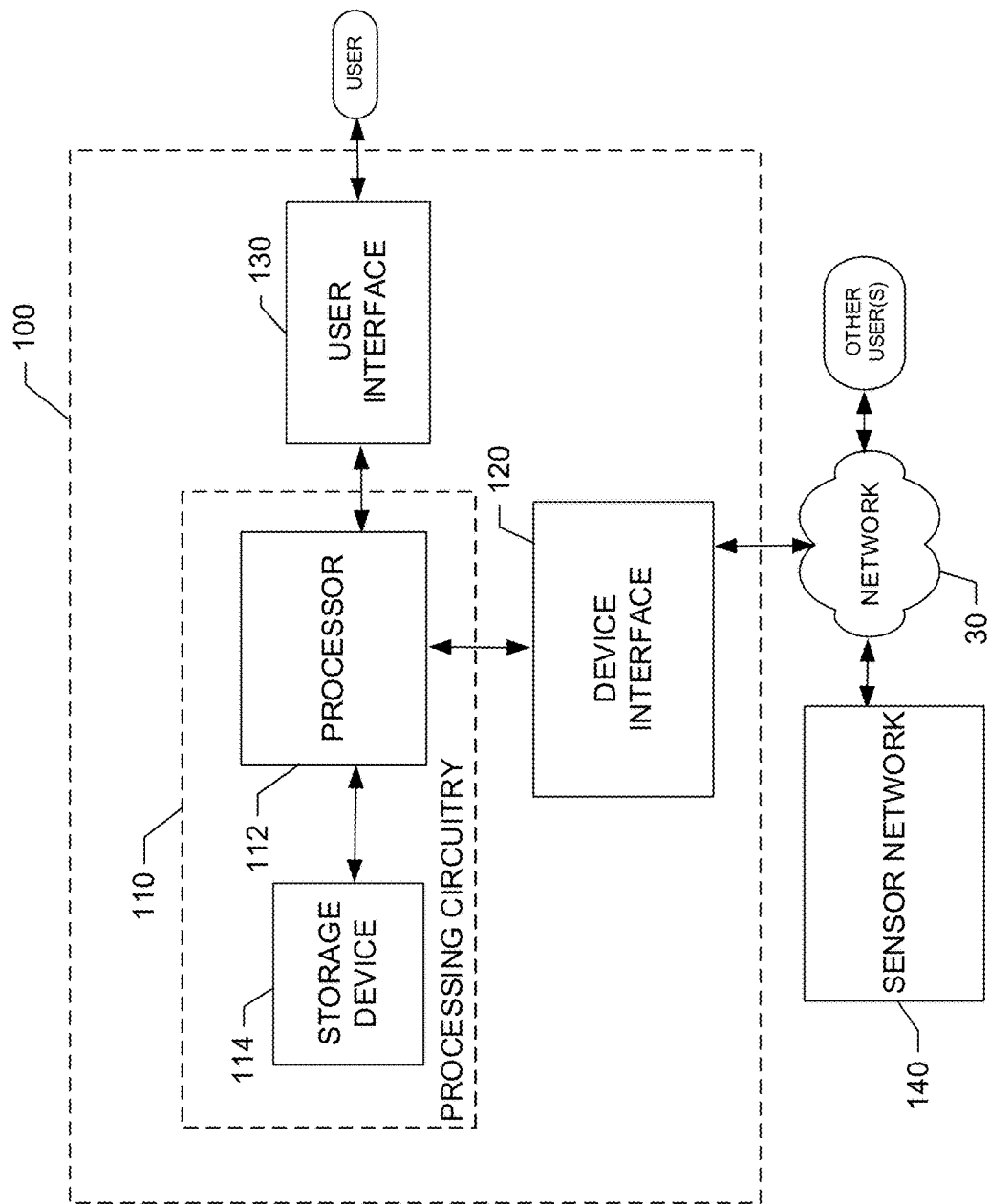
FIG. 2 illustrates a block diagram of one example of onboard electronics or monitoring circuitry that may be used in connection with employment of an example embodiment.

Each of the personnel devices 50 may include sensors, such as location sensors, cameras, scanners, or the like and/or a user interface, as discussed below in reference to FIG. 2. The personnel device 50 may, in some cases, be useful for viewing a safety map and/or receiving and displaying alerts.

In an example embodiment, each of the devices 20, 50 may include onboard circuitry 22 which may include or otherwise be embodied as a computing device (e.g. a processor, microcontroller, processing circuitry, or the like) capable of communication with a network 30. As such, for example, each one of the devices 20, 50 may include (or otherwise have access to) memory for storing instructions or applications for the performance of various functions and a corresponding processor for executing stored instructions or applications and a corresponding processor or processing circuitry. Each one of the devices 20, 50 may also include software and/or corresponding hardware (e.g. the onboard circuitry 22) for enabling the performance of the respective functions of the clients as described below. In an example embodiment, one or more of the devices 20, 50 may be configured to execute applications or functions implemented via software for enabling a respective one of the devices 20, 50 to communicate with the network 30 for requesting and/or receiving information and/or services via the network 30 and/or for providing data to other devices via the network 30. The information or services receivable at the devices 20, 50 may include deliverable components (e.g. downloadable software to configure the onboard circuitry 22 of the devices 20, 50, or information for consumption or utilization at the onboard circuitry 22 of the devices 20, 50).

The network 30 may be a data network, such as a local area network (LAN), a metropolitan area network (MAN), a wide area network (WAN) (e.g. the Internet), and/or the like, which may couple the devices 20, 50 to devices such as processing elements (e.g. personal computers, server computers or the like) and/or databases. Communication between the network 30, the devices 20, 50 and the devices or databases (e.g. servers) to which the devices 20, 50 are coupled may be accomplished by either wired or wireless communication mechanisms and corresponding communication protocols.

In an example embodiment, other devices to which the devices 20, 50 may be coupled via the network 30 may include a server network 32 including one or more application servers (e.g. application server 40), and/or a database server 42, which together may form respective elements of the server network 32. Although the application server 40 and the database server 42 are each referred to as "servers," this does not necessarily imply that they are embodied on separate servers or devices. As such, for example, a single server or device may include both entities and the database server 42 could merely be represented by a database or group of databases physically located on the same server or device as the application server 40. The application server 40 may include monitoring circuitry 44 (which may be similar to or different from the onboard circuitry 22 of the devices 20, 50) that may include hardware and/or software for configuring the application server 40 to perform various functions. As such, for example, the application server 40 may include processing logic and memory enabling the application server 40 to access and/or execute stored computer readable instructions for performing various functions.

In an example embodiment, one function that may be provided by the application server 40 (e.g. via the monitoring circuitry 44) may be the provision of services relating to safety condition determination, as will be described in greater detail below. For example, the application server 40 may be local or remote and configured to receive data from the devices 20, 50 and process the data to coordinate construction site operations, as described herein. Thus, for example, the onboard circuitry 22 may be configured to send the data to the application server 40 for the application server to coordinate construction site operations (e.g. monitor and/or deploy personnel and/or device 20, 50 to locations throughout the construction site), or have actions associated therewith (e.g. send information, alerts, or safety interlocks to devices 20, 50). In some embodiments, the application server 40 may be configured to provide devices 20, 50 with instructions (e.g. for execution by the onboard circuitry 22) for taking prescribed actions when corresponding safety conditions are identified.

Accordingly, in some example embodiments, data from devices 20, 50 may be provided to and analyzed at the application server 40 to identify or define a construction site status (CSS) (e.g. in real time or at a later time). The CSS may be associated with actions to be taken by the corresponding one of the devices 20, 50 that sent the data (or another device within the construction site) in response to a future detection of the CSS. The application server 40 may then equip one or more of the devices 20, 50 to detect the defined CSS in the future, and also provide instructions for actions to be taken when the defined CSS is encountered. Each one of the devices 20, 50 that has received the instructions may then detect the defined CSS and take the appropriate action. In one example embodiment, the CSS may include the determination of a safety condition based on the construction device location data associated with a construction device and the worker location data associated with a worker.

Alternatively or additionally, data from devices 20, 50 may be provided to and analyzed at the application server 40 (e.g. in real time) to identify or define a CSS. The CSS may be associated with actions to be taken by the application server 40 in response to a future detection of the CSS. The application server 40 may then provide a report or warning or may direct action to be taken at one or more devices 20, 50 when an occurrence of the defined CSS is detected in the future.

In still other embodiments, the devices 20, 50 themselves may analyze data for detection of CSSs (e.g. using the onboard circuitry 22) and define and/or take action responsive to detecting the occurrence of a defined CSS. Thus, the devices 20, 50 may operate in some cases independently of the network 30 and the application server 40. However, in some cases, the application server 40 may be used to provide defined CSSs to the devices 20, 50 and the devices 20, 50 may be configured thereafter to operate to detect CSSs and take actions correspondingly.

In some embodiments, for example, the onboard circuitry 22 and/or the monitoring circuitry 44 may include or have access to stored instructions for handling activities associated with practicing example embodiments as described herein. As such, in some embodiments, the onboard circuitry 22 and/or the monitoring circuitry 44 may include software and/or hardware for enabling the onboard circuitry 22 and/or the monitoring circuitry 44 to communicate via the network 30 for the provision and/or receipt of information associated with performing activities as described herein.

The system 10 of FIG. 1 may support CSS definition, detection and responses to detection on the basis of the execution of functionality that is executed using either or both of the onboard circuitry 22 and the monitoring circuitry 44. FIG. 2 illustrates a block diagram showing components that may be associated with an embodiment of the onboard circuitry 22 and/or the monitoring circuitry 44 according to an example embodiment. As shown in FIG. 2, the onboard circuitry 22 and/or the monitoring circuitry 44 may include or otherwise be embodied as a CSS monitoring device 100. The CSS monitoring device 100 may be embodied in a construction device 20, a personnel device 50, a separate computing device, or be distributed among the devices 20, 50, and/or a separate computing device. The CSS monitoring device 100 may include processing circuitry 110 of an example embodiment, as described herein. In this regard, for example, the CSS monitoring device 100 may utilize the processing circuitry 110 to provide electronic control inputs to one or more functional units of the onboard circuitry 22 and/or the monitoring circuitry 44 and to process data generated by the one or more functional units regarding various indications of device activity (e.g. operational parameters and/or location information) relating to a corresponding one of the devices 20, 50. In some cases, the processing circuitry 110 may be configured to perform data processing, control function execution and/or other processing and management services according to an example embodiment of the present invention. In some embodiments, the processing circuitry 110 may be embodied as a chip or chip set. In other words, the processing circuitry 110 may comprise one or more physical packages (e.g. chips) including materials, components and/or wires on a structural assembly (e.g. a baseboard). The structural assembly may provide physical strength, conservation of size, and/or limitation of electrical interaction for component circuitry included thereon. The processing circuitry 110 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 110 may include one or more instances of a processor 112 and memory 114 that may be in communication with or otherwise control a device interface 120 and, in some cases, a user interface 130. As such, the processing circuitry 110 may be embodied as a circuit chip (e.g. an integrated circuit chip) configured (e.g. with hardware, software or a combination of hardware and software) to perform operations described herein. However, in some embodiments, the processing circuitry 110 may be embodied as a portion of an on-board computer on a device being monitored (e.g. one of the devices 20, 50), while in other embodiments, the processing circuitry 110 may be embodied as a remote computer that monitors device activity for one or more devices.

The user interface 130 may be in communication with the processing circuitry 110 to receive an indication of a user input at the user interface 130 and/or to provide an audible, visual, tactile or other output to the user. As such, the user interface 130 may include, for example, a display, one or more levers, switches, buttons or keys (e.g. function buttons), and/or other input/output mechanisms. In an example embodiment, the user interface 130 may include one or a plurality of lights, a display, a speaker, a tone generator, a vibration unit and/or the like.

The device interface 120 may include one or more interface mechanisms for enabling communication with other devices (e.g. sensors of the sensor network 140, or functional units of the CSS monitoring device 100 or other construction equipment on which an example embodiment may be employed). In some cases, the device interface 120 may be any means such as a device or circuitry embodied in either hardware, or a combination of hardware and software that is configured to receive and/or transmit data from/to sensors in communication with the processing circuitry 110 via internal communication systems of the CSS monitoring device 100. In some cases, the device interface 120 may further include wireless communication equipment (e.g. a one way or two way radio) for at least communicating information from the CSS monitoring device 100 to a network and, in the case of a two way radio, in some cases receiving information from a network.

The processor 112 may be embodied in a number of different ways. For example, the processor 112 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 112 may be configured to execute instructions stored in the memory 114 or otherwise accessible to the processor 112. As such, whether configured by hardware or by a combination of hardware and software, the processor 112 may represent an entity (e.g. physically embodied in circuitry—in the form of processing circuitry 110) capable of performing operations according to embodiments of the present invention while configured accordingly. Thus, for example, when the processor 112 is embodied as an ASIC, FPGA or the like, the processor 112 may be specifically configured hardware for conducting the operations described herein. Alternatively, as another example, when the processor 112 is embodied as an executor of software instructions, the instructions may specifically configure the processor 112 to perform the operations described herein.

In an example embodiment, the processor 112 (or the processing circuitry 110) may be embodied as, include or otherwise control the operation of the CSS monitoring device 100 based on inputs received by the processing circuitry 110. As such, in some embodiments, the processor 112 (or the processing circuitry 110) may be said to cause each of the operations described in connection with the CSS monitoring device 100 in relation to operation the CSS monitoring device 100 relative to undertaking the corresponding functionalities associated therewith responsive to execution of instructions or algorithms configuring the processor 112 (or processing circuitry 110) accordingly.

In an exemplary embodiment, the memory 114 may include one or more non-transitory memory devices such as, for example, volatile and/or non-volatile memory that may be either fixed or removable. The memory 114 may be configured to store information, data, applications, instructions or the like for enabling the processing circuitry 110 to carry out various functions in accordance with exemplary embodiments of the present invention. For example, the memory 114 could be configured to buffer input data for processing by the processor 112. Additionally or alternatively, the memory 114 could be configured to store instructions for execution by the processor 112. As yet another alternative or additional capability, the memory 114 may include one or more databases that may store a variety of data sets responsive to input from the sensor network 140, the CSS monitoring device 100, or any other functional units that may be associated with the CSS monitoring device 100. Among the contents of the memory 114, applications may be stored for execution by the processor 112 in order to carry out the functionality associated with each respective application.

In some embodiments, the processing circuitry 110 may communicate with electronic components and/or sensors of a sensor network 140 (e.g. sensors that measure variable values related to device location, orientation, and/or operational parameters like RPM, temperature, oil pressure, and/or the like, and/or sensors that measure device movement employing movement sensor circuitry) of the construction device 20 via the device interface 120. In one embodiment, sensors of a sensor network 140 of one or more ones of the devices 20, 50 may communicate with the processing circuitry 110 of a remote monitoring computer via the network 30 and the device interface 120 using wireless communication or by downloading data that is transferred using a removable memory device that is first in communication with the construction device 20 to load data indicative of device activity, and is then (e.g. via the device interface 120) in communication with the remote monitoring computer (e.g. associated with the monitoring circuitry 44).

In some embodiments, the processing circuitry 110 may communicate with movement sensor circuitry of the devices 20, 50 (e.g. when the processing circuitry 110 is implemented as the onboard circuitry 22), or may receive information indicative of device location from movement sensor circuitry of one or more devices being monitored (e.g. when the processing circuitry is implemented as the monitoring circuitry 44). The movement sensor circuitry may include movement sensors (e.g. portions of the sensor network 140) such as one or more accelerometers and/or gyroscopes, or may include global positioning system (GPS) or other location determining equipment.

The movement sensor circuitry (if employed) may be configured to provide indications of movement of the devices 20, 50 based on data provided by the one or more accelerometers and/or gyroscopes, and/or based on GPS or local position determining capabilities. In other words, the movement sensor circuitry may be configured to detect movement of the devices 20, 50 based on inertia-related measurements or other location determining information. In some example embodiments, the movement sensor circuitry may include orientation sensors, configured to detect the orientation of a device, particularly the working element of the device, relative to the determined location or a reference point/structure of the determined location.

Figure 3:
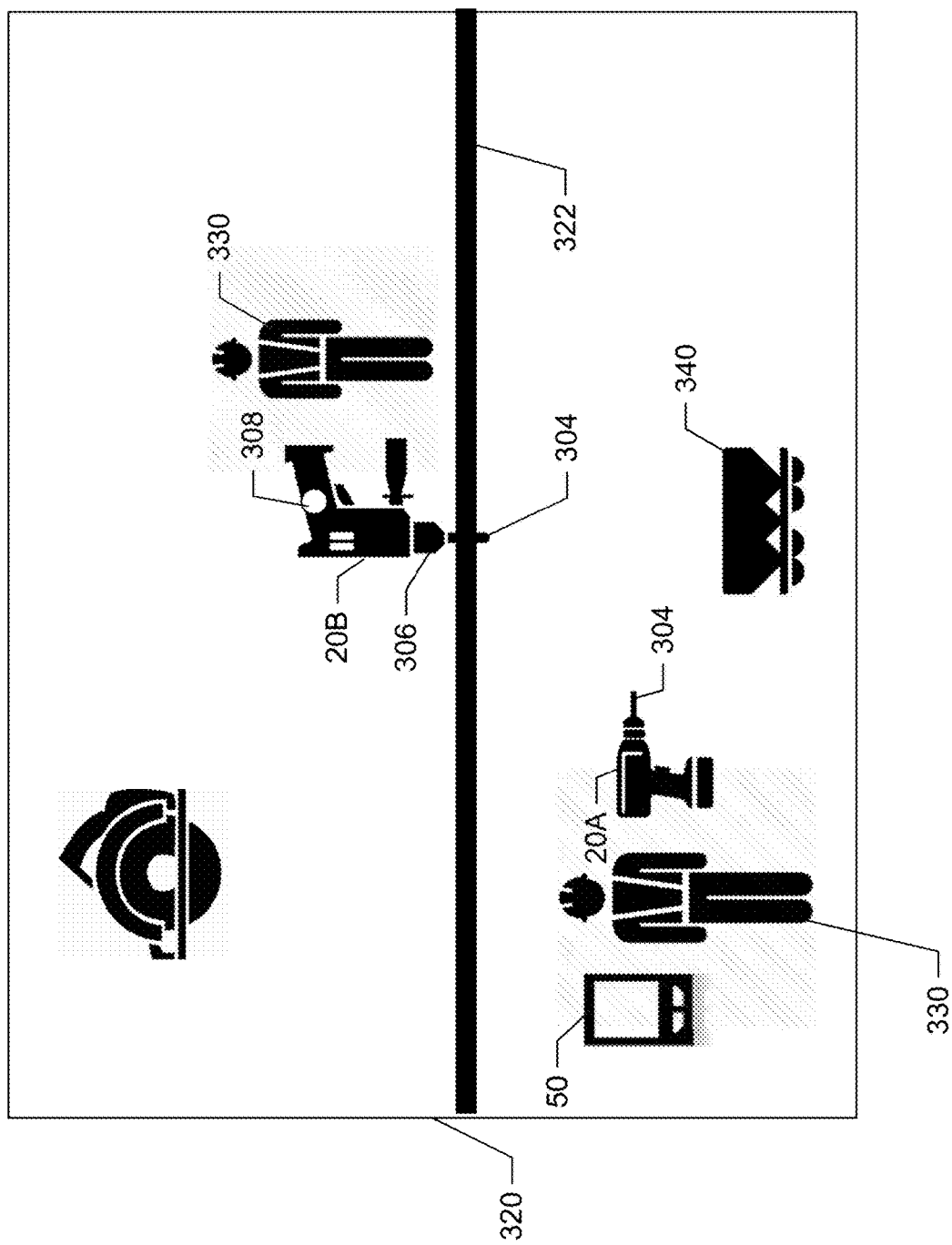
FIG. 3 illustrates an example construction site according to an example embodiment.

FIG. 3 illustrates an example construction site 320 according to an example embodiment. The construction site 320 may include one or more construction devices 20 (e.g. 20A, 20B), such as saws, drills, grinders, or the like. The construction device 20 may include a working element 304, such as a blade, drill bit, grinding head, nailer, or the like, configured to perform work such as cutting, drilling, grinding or fastening, on a working material. In an example embodiment, the working material 322 may be a wall, ceiling, floor, or the like, of a structure in the construction site 320. A CSS may include determining a safety condition based on construction device location data associated with a construction device 20 and worker location data associated with a worker 330.

In an example embodiment, a construction site 320 may include a plurality of construction devices 20. The CSS monitoring device 100 (e.g. construction device 20, personnel device 50, application server 40, or combination thereof) may receive device identifiers from the respective construction devices 20. The device identifiers, may include data indicative of the make/model, specific device type, generic device type, or the like of a construction device 20, for example Husqvarna DM-230, Core Drill, Drill, serial number, Stock Keeping Unit (SKU) code, alias (e.g. Grant's Drill), or the like. In some example embodiments, the device identifier may be indicative of a size or length of the working element 304 of the construction device.

The CSS monitoring device 100 may also receive construction device location data associated with the respective construction devices 20. The location data may be an actual location or a proximate location, derived from a location sensor, such as a portion of the sensor network 140, associated with the respective construction devices 20 and/or respective device identifiers. For example, the location data may be GPS coordinates, received signal strength indicator (RSSI), 10 feet away, 3 meters north, or the like. The location sensors may include without limitations, GPS, active radio frequency identification (RFID), passive RFID, or the like.

The CSS monitoring device 100 may receive worker location data associated with a worker 330. The location data associated with the worker 330 may be an actual or a proximate location, derived from a location sensor, such as a portion of the sensor network 140 associated with a construction device 20 and/or a personnel device 50. In an example embodiment, personnel devices 50, may be portable computing devices, such as a smart phone, laptop computer, or the like. In some example embodiments, the personnel device 50 may include a location transponder, such as attached to a construction vest, belt, helmet, or the like. The personnel device 50 and/or construction device 20 may be associated with a worker 330 based on scanning an identification code, such as a serial number, barcode, QR code or the like, manual entry of the association using the user interface 130, or automatic association based on proximity of the worker 330 and the device 20, 50.

Figure 4:
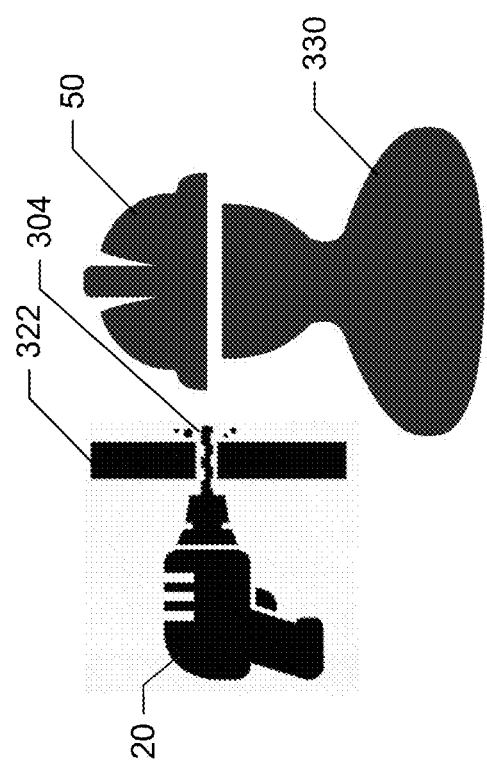
FIG. 4 illustrates a construction device working element penetration according to an example embodiment.

As depicted in FIG. 4, in an example embodiment, the construction device location data associated with the worker 330 and worker location data associated with a construction device 20 may indicate that the worker 330 is in proximity to the working element 304 of the construction device 20. In some examples, the worker 330 may be unaware of the operation of construction device 20, due to the presence of a noisy work environment or in an instance in which the worker 330 is located on the opposite side of the working material 320, e.g. ceiling, floor, or wall. The CSS monitoring device 100 may determine a safety condition e.g. "safe", "caution", "danger", or the like, based on the construction device location data associated with the construction device 20 and the worker location data associated with the worker 330. In an example embodiment, the CSS monitoring device 100 may compare the distance between the construction device, based on the construction device location data, to the worker location, based on the worker location data, to a predetermined safety threshold, such as 12 inches, 24 inches, 36 inches, or the like. The predetermined safety threshold may be automatically determined based on the device type of the device identifier or a default safety threshold, and/or may be entered or modified by an operator, e.g. worker 330, using the user interface 130. In an instance in which the distance between the construction device location and the worker location satisfies, e.g. is less than, the predetermined safety threshold, the CSS monitoring device 100 may determine a safety condition of "danger". In an instance in which the predetermined safety threshold is not satisfied, the CSS monitoring device 100 may determine a safety condition of "safe".

In an example embodiment, two or more predetermined safety thresholds may be utilized. For example, the CSS monitoring device 100 may include a first predetermined safety threshold, such as 36 inches, and a second predetermined safety threshold of 20 inches. In an instance in which neither predetermined safety threshold is satisfied the CSS monitoring device 100 may determine a safety condition of "safe". In an instance in which the first predetermined safety threshold is satisfied the CSS monitoring device 100 may determine a safety condition of "caution". In an instance in which the second predetermined safety threshold is satisfied, the CSS monitoring device 100 may determine a safety condition of "danger".

In some example embodiments, the CSS monitoring device 100 may receive sensor data from the construction device 20. The sensor data may be indicative of an operating condition of the construction device 20, such as off, idle, running, or the like. In an example embodiment, the sensor data may also include the orientation of the construction device 20 (e.g. orientation and/or direction of the working element 304). The CSS monitoring device 100 may use the sensor data in the determination of the safety condition. For example, the CSS monitoring device 100 may determine a safety condition of "safe", in an instance in which the construction device is off, or oriented in a direction away from the worker 330. The CSS monitoring device 100 may determine a safety condition of "caution", in an instance in which the construction device 20 is idle and/or oriented in a direction toward the worker 330; and may determine a safety condition of "danger" in an instance in which the construction device 20 is running and oriented in the direction of the worker 330.

In some example embodiments, the CSS monitoring device 100 may receive a construction site map. The construction site map may be received from a local memory, such as storage device 114, or a remote memory, such as database server 42. The construction site map may include a two dimensional or three dimensional model of the construction site, including ceiling, floors, walls, or the like, of one or more structures. In some example embodiments, the construction site map may include thicknesses and or materials associated with the floors, ceilings, or walls, of a structure. The CSS monitoring device 100 may utilize the construction site map in determining the safety condition. For example, a safety condition of "safe" may be determined in an instance in which the construction device 20 and worker 330 are not separate by a wall, ceiling, or floor; and determine a "caution" or "danger" safety condition in an instance in which the construction device 20 and worker are on opposite sides of a wall, ceiling, or floor.

In an example embodiment, the CSS monitoring device may analyze the thickness or materials of the working material 322, e.g. a floor, ceiling, or wall and the working element 304. For example, the CSS monitoring device, may determine a safety condition of "safe" in an instance in which the length of the working element 304 is shorter than the thickness of working material 322, or the working device may not penetrate the material, such as most drill bits engaging metal, stone, or concrete. The CSS monitoring device 100 may determine a safety condition of "danger" in an instance in which the working element 304 is longer than the thickness of the working material 322 and/or the working element 304 may penetrate the working material 322.

In an example embodiment, the CSS monitoring device 100 may cause an alert to be actuated based on the safety condition. The alert may include an indicator 308 such as a warning light or warning lights indicative of a safety condition, e.g. green indicating "safe", yellow indicating "caution", and/or red indicating "danger". In some example embodiments, the alert may be a tactile feedback, such as a vibration from a vibration motor in a handle of the construction device 20. Additionally or alternatively, the alert may be an audio or visual indication on the user interface 130 of a personnel device 50.

In some example embodiments, the CSS monitoring device 100 may be configured to cause the construction device 20 to shutdown based on the safety condition. The CSS monitoring device 100 may cause the construction device 20 to shutdown to prevent or limit injury to a worker, such as in an instance in which the worker 330 is on the opposite side of a working material 322. In an instance in which the CSS monitoring device 100 determines a safety condition, such as danger, the CSS monitoring device 100 may cause the construction device 20 to shutdown, such as by electrically, mechanically, or programmatically preventing operation of the construction device 20. In an example embodiment, the shutdown may include immobilization of the construction device 20, such as a material catcher 340.

In an example embodiment, the CSS monitoring device 100 may generate a safety map based on the construction device location data, worker location data, and the construction site map. Generation of the safety map may include overlaying construction device location data and worker location data on the construction site map. In some example embodiments, the location of the construction device may include the device type, orientation, operating condition, or the like of the construction device 20, as indicated by color, text, icons, or the like.

In an example embodiment, the safety map may be displayed on the user interface 130 for use by the operator 330. The user interface 130 may be associated with the construction device 20, the personnel device 50, or the CSS monitoring device 100. In some example embodiments, the safety map may be displayed based on a request by the operator 330, such as a selection in a CSS monitoring program or application running on the CSS monitoring device 100 or personnel device 50.

In an example embodiment, the construction devices 20 may also include the material catcher 340. The material catcher 340 may include a catching portion (e.g., basket, bucket, net, canvas, tarp, etc.) configured to receive (and/or catch, collect, store, contain) debris or material from construction operations, such as drilling or sawing on a floor or ceiling. In some example embodiments, the debris may include drill cores. The material catcher 340 may include a mobility assembly (e.g., wheels, tracks), and may be embodied as a robotic device. In some example embodiments, the material catcher 340 may move automatically to various locations using the mobility assembly. Additionally or alternatively, the material catcher may be configured to dump (e.g., by pivoting the catching portion from a first position to a second position), unload, empty, and/or otherwise dispose of the debris/material in the catching portion.

The CSS monitoring device 100 may cause the material catcher 340 to be deployed based on the safety map. The CSS monitoring device 100 may cause the material catcher 340 to be positioned underneath, e.g. substantially the same location one floor below, the construction device 20 or working element 304 performing the construction operation. The debris may fall into the material catcher 340. At the completion of the construction operation or in an instance in which the material catcher 340 is full, the material catcher 340 may transport the debris to a predetermined waste collection area, such as a dumpster, drop shoot, rubbish pile, or the like.

In some instances, the material catcher 340 may be includes an indicator, such as a buzzer, alarm, flashing lights, or the like. The alert, as discussed above may include actuating the indicator associated with the material catcher 340 to warn workers in the area of falling debris. The CSS monitoring device 100 may cause the alert to be actuated based on the safety map and/or the safety condition.

FIG. 4 illustrates penetration of a working element 304 of a construction device 20 through a working material 322 according to an example embodiment. In this example the working material 322 is a wall and an operator 330 is proximate to the opposite side of the wall, where the working element 304 is penetrating. An alert received by either the operator 330 operating the construction device 20 or the operator on the opposite side of the working material 322 may avoid potential contact of the working element and the operator 330 and increase the safety of the construction site. 320

Figure 5:
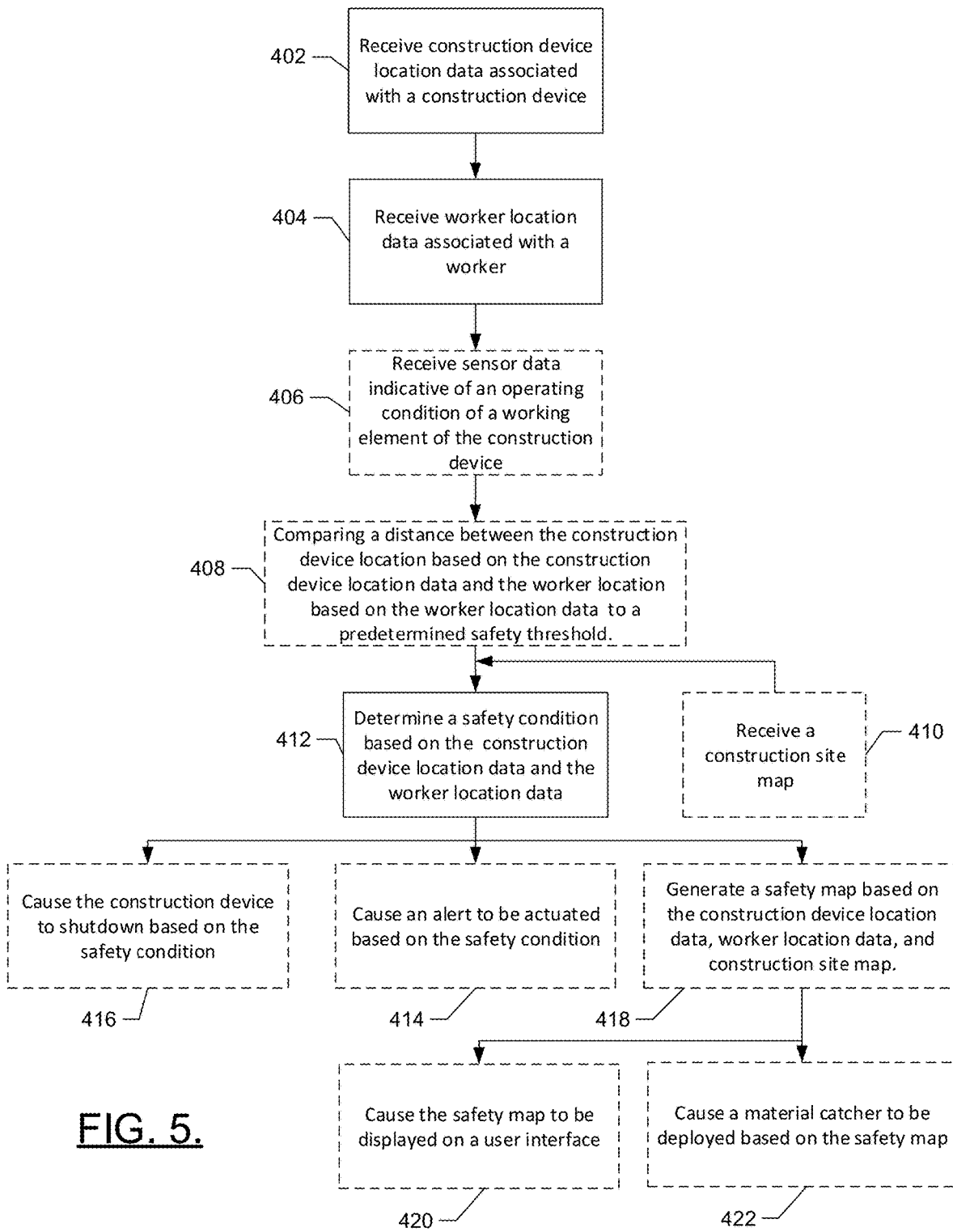
FIG. 5 illustrates a method of utilizing a construction site status monitoring device in relation to operation of construction devices according to an example embodiment.

In some cases, a method of utilizing CSS analysis in relation to operation of the CSS monitoring device 100 and/or one or more construction devices 20 according to an example embodiment may be provided. FIG. 5 illustrates a block diagram of some activities that may be associated with one example of such a method. In some embodiments, the processing circuitry 110 (which may include a processor capable of executing instructions stored in a non-transitory computer readable medium/memory) may be configured to implement a control algorithm for the CSS monitoring device 100 and/or the one or more construction tools according to the method.

In an example embodiment, the method may include receiving construction device location data associated with a construction device at operation 402, receiving worker location data associated with a worker at operation 404, and determining a safety condition based on the construction device location data and the worker location data at operation 412.

In some embodiments, the method may include additional, optional operations, and/or the operations described above may be modified or augmented. Some examples of modifications, optional operations, and augmentations are described below, as indicated by dashed lines, such as, receiving sensor data indicative of an operating condition of a working element of the construction device at operation 406, comparing a distance between the construction device location data and the worker location data to a predetermined safety threshold at operation 408, receiving a construction site map at operation 410, generating a safety map based on the construction device location data, the worker location, and the construction site map at operation 418, and causing the safety map to be displayed on a user interface at operation 420. In an example embodiment, the method may include causing a material catcher to be deployed based on the safety map at operation 422. In some example embodiments, the method may also include causing an alert to be actuated based on the safety condition at operation 414, and causing the construction device to shutdown based on the safety condition at operation 416.

In an example embodiment, the CSS monitoring device may comprise a processor (e.g. the processor 112) or processing circuitry 110 configured to perform some or each of the operations (402-422) described above. The processor 112 may, for example, be configured to perform the operations (402-422) by performing hardware implemented logical functions, executing stored instructions, or executing algorithms for performing each of the operations. In some embodiments, the processor 112 or processing circuitry 110 may be further configured for additional operations or optional modifications to operations 402-422. In this regard, in an example embodiment, the processing circuitry is further configured to compare a distance between the construction device location, based on the construction device location data, and the worker location, based on the worker location data, to a predetermined safety threshold and determining the safety condition is further determined based on the comparison of the distance between the construction device location and the worker location to the predetermined safety threshold. In an example embodiment, the predetermined safety threshold is based on a device type of the construction device. In some example embodiments, the processing circuitry is further configured to receive a construction site map and determining the safety condition is further based on the construction site map. In an example embodiment, the processing circuitry is further configured to generate a safety map based on the construction device location data, the worker location data, and the construction sitemap and cause the safety map to be displayed on a user interface. In an example embodiment, the processing circuitry is further configured to cause a material catcher to be deployed based on the safety map. In some example embodiments, the processing circuitry is further configured to cause an alert to be generated based on the safety condition. In an example embodiment, the processing circuitry is further configured to cause the construction device to shutdown based on the safety condition. In some example embodiments, the processing circuitry is further configured to receive sensor data indicative of an operating condition of a working element of the construction device and determining a safety condition is further based on the operation condition of the working element. In an example embodiment, the sensor data is further indicative of an orientation of the construction device.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A construction site status monitoring device comprising processing circuitry configured to:
   receive construction device location data associated with a construction device;
   receive worker location data associated with a worker;
   receive sensor data from the construction device indicative of:
      an operating condition of the construction device, the operating condition comprising off, idle, or running, and
      an orientation of operation of the construction device or a direction of operation of the construction device;
   compare the construction device location data and the worker location data to a plurality of predetermined safety thresholds;
   determine a safety condition based on:
      the comparison of the construction device location data and the worker location data to the plurality of predetermined safety thresholds,
      a construction site map that indicates walls, ceilings, or floors of a structure being acted upon by construction activities,
      the operation condition of the construction device, and
      the orientation of the construction device of the direction of operation of the construction device; and
   cause an alert to be generated based on the safety condition,
   wherein each of the plurality of predetermined safety thresholds corresponds to a level of the safety condition, one of the levels being safe or no danger detected when the comparison of the construction device location data and the worker location data and the construction site map indicates that the worker and the construction device are not on opposite sides of a wall, ceiling, or floor of the structure being acted upon by construction activities, and
   wherein causing the alert comprises causing the alert to be generated based on the level of the safety condition.

2. The construction site status monitoring device of claim 1, wherein the processing circuitry is further configured to:
   compare a distance between a construction device location, based on the construction device location data, and a worker location, based on the worker location data, to the plurality of predetermined safety thresholds, and
   wherein determining the level of the safety condition is further determined based on the comparison of the distance between the construction device location and the worker location to the plurality of predetermined safety thresholds.

3. The construction site status monitoring device of claim 1, wherein the processing circuitry is further configured to:
   generate a safety map based on the construction device location data, the worker location data, and the construction site map; and
   cause the safety map to be displayed on a user interface.

4. The construction site status monitoring device of claim 3, wherein the processing circuitry is further configured to:
   cause a material catcher to be deployed based on the safety map.

5. The construction site status monitoring device of claim 1, wherein other levels of the safety condition include caution and danger detected, wherein the processing circuitry is further configured to:
cause the construction device to shutdown based on the level of the safety condition being danger detected.

6. The construction site status monitoring device of claim 1, wherein the processing circuitry is further configured to:
receive sensor data indicative of an operating condition of a working element of the construction device, and
wherein determining the level of the safety condition is further based on the operation condition of the working element.

7. The construction site status monitoring device of claim 1, wherein the construction site map is a three dimensional model of the structure being acted upon by construction activities.

8. A construction site status monitoring system comprising:
processing circuitry configured to:
receive construction device location data associated with a construction device;
receive worker location data associated with a worker;
receive sensor data from the construction device indicative of:
an operating condition of the construction device, the operating condition comprising off, idle, or running, and
an orientation of operation of the construction device or a direction of operation of the construction device;
compare the construction device location data and the worker location data to a plurality of predetermined safety thresholds; and
determine safety zones of the construction device based on:
the comparison of the construction device location data and the worker location data to the plurality of predetermined safety thresholds,
the operation condition of the construction device, and
the orientation of the construction device of the direction of operation of the construction device; and
a construction site map that indicates walls, ceilings, or floors of a structure being acted upon by construction activities, the safety zones being a danger zone, an intermediate zone, and a safe zone,
wherein the danger zone indicates the worker associated with the worker location data and the construction device associated with the construction device location data are on opposite sides of a wall, ceiling, or floor of the structure being acted upon by construction activities based on the construction site map.

9. The construction site status monitoring system of claim 8, wherein the processing circuitry is further configured to:
generate a safety map based on the construction device location data, the worker location data, and the construction site map; and
cause the safety map to be displayed on a user interface.

10. The construction site status monitoring device of claim 9 further comprising:
a material catcher, and
wherein the processing circuitry is further configured to cause a material catcher to be deployed based on the safety map.

11. The construction site status monitoring system of claim 8, wherein the processing circuitry is further configured to:
cause an alert to be generated based on the determined safety zone.

12. The construction site status monitoring system of claim 8, wherein the processing circuitry is further configured to:
cause the construction device to shutdown based on the determined safety zone being the danger zone.

13. The construction site status monitoring system of claim 8, wherein the processing circuitry is further configured to:
receive data indicative of an operating mode of the construction device, and
wherein determining the safety zone is further based on the operating mode.

14. A construction site status monitoring device comprising processing circuitry configured to:
receive construction device location data associated with a construction device;
receive worker location data associated with a worker;
receive sensor data from the construction device indicative of:
an operating condition of the construction device, the operating condition comprising off, idle, or running, and
an orientation of operation of the construction device or a direction of operation of the construction device;
compare the construction device location data and the worker location data to a plurality of predetermined safety thresholds;
determine a safety condition based on:
the comparison of the construction device location data and the worker location data to the plurality of predetermined safety thresholds,
a construction site map that indicates a working material of a structure being acted upon by construction activities and a thickness of the working material, the working material being a wall, ceiling, or floor of the structure being acted upon by construction activities,
the operation condition of the construction device, and
the orientation of the construction device of the direction of operation of the construction device; and
cause an alert to be generated based on the safety condition,
wherein each of the plurality of predetermined safety thresholds corresponds to a level of the safety condition, one of the levels being caution or danger detected based on the comparison of the construction device location data and the worker location data and a working element of the construction device being longer than the thickness of the working material of the structure being acted upon by construction activities, and
wherein causing the alert comprises causing the alert to be generated based on the level of the safety condition.

15. The construction site status monitoring device of claim 14, wherein the construction site map indicates a working material type for the working material, the working material being metal, stone, or concrete; and
wherein being configured to determine the safety condition includes being configured to determine the safety condition based on use of the working element in association with the working material type of the working material.

* * * * *